US008872895B2

(12) United States Patent
Hsu et al.

(10) Patent No.: US 8,872,895 B2
(45) Date of Patent: Oct. 28, 2014

(54) REAL-TIME VIDEO CODING USING GRAPHICS RENDERING CONTEXTS

(75) Inventors: Cheng-Hsin Hsu, Miao-Li (TW); Shu Shi, Urbana, IL (US); Klara Nahrstedt, Savoy, IL (US); Roy H. Campbell, Champaign, IL (US)

(73) Assignees: Deutsche Telekom AG, Bonn (DE); University of Illinois, Champaign, IL (US)

( * ) Notice: Subject to any disclaimer, the term of this patent is extended or adjusted under 35 U.S.C. 154(b) by 356 days.

(21) Appl. No.: 13/249,447

(22) Filed: Sep. 30, 2011

(65) Prior Publication Data

US 2013/0083161 A1 Apr. 4, 2013

(51) Int. Cl.
| | |
|---|---|
| *H04N 15/00* | (2006.01) |
| *H04N 13/00* | (2006.01) |
| *H04N 7/12* | (2006.01) |
| *H04N 11/02* | (2006.01) |
| *H04N 11/04* | (2006.01) |
| *H04N 19/597* | (2014.01) |
| *A63F 13/30* | (2014.01) |
| *H04N 19/146* | (2014.01) |
| *H04N 19/172* | (2014.01) |
| *H04N 19/159* | (2014.01) |
| *H04N 19/115* | (2014.01) |

(52) U.S. Cl.
CPC .......... *A63F 13/12* (2013.01); *H04N 19/00169* (2013.01); *H04N 19/00266* (2013.01); *H04N 19/00218* (2013.01); *H04N 19/00769* (2013.01); *H04N 13/0048* (2013.01); *H04N 19/0006* (2013.01); *A63F 2300/538* (2013.01); *H04N 13/0011* (2013.01); *H04N 13/0022* (2013.01)

USPC ............... 348/43; 375/240.2; 375/240.03; 375/240.12

(58) Field of Classification Search
USPC ............ 348/43; 382/107; 375/240.02, 240.16
See application file for complete search history.

(56) References Cited

U.S. PATENT DOCUMENTS

| | | | | |
|---|---|---|---|---|
| 5,907,626 | A | * | 5/1999 | Toklu et al. .................... 382/107 |
| 6,526,097 | B1 | * | 2/2003 | Sethuraman et al. ...... 375/240.2 |
| 7,194,033 | B2 | | 3/2007 | Yourlo |
| 2006/0029134 | A1 | * | 2/2006 | Winder et al. ........... 375/240.12 |
| 2006/0088220 | A1 | | 4/2006 | Cheung et al. |

(Continued)

OTHER PUBLICATIONS

Leonard McMillan and Gary Bishop. 1995. Plenoptic modeling: an image-based rendering system. In *Proceedings of the 22nd annual conference on Computer graphics and interactive techniques (SIGGRAPH '95)*, ACM, New York, NY, USA, 39-46.

(Continued)

*Primary Examiner* — Hee-Yong Kim
(74) *Attorney, Agent, or Firm* — Leydig, Voit & Mayer, Ltd.

(57) ABSTRACT

A method for encoding video for streaming includes receiving a plurality of sequential image frames generated by a 3D graphics rendering engine. Graphics rendering contexts are obtained, including pixel depth map, rendering camera parameters, and camera motion from the 3D rendering engine. The method next entails selecting key frames among the plurality of sequential image frames, interpolating non-key frames via 3D image warping, and encoding all key frames and warping residues of non-key frames. The system is implementable on a server linked to a mobile user device for receiving the encoded frame data. The mobile user device is configured to decode the encoded frame data and display a corresponding image to a user of the mobile user device.

17 Claims, 6 Drawing Sheets

(56) References Cited

U.S. PATENT DOCUMENTS

| | | |
|---|---|---|
| 2008/0212838 A1* | 9/2008 | Frigerio .................. 382/107 |
| 2010/0061448 A1* | 3/2010 | Zhou et al. .............. 375/240.03 |
| 2010/0104017 A1* | 4/2010 | Faerber et al. .......... 375/240.16 |
| 2010/0166054 A1 | 7/2010 | Wirick |
| 2010/0166068 A1 | 7/2010 | Perlman et al. |
| 2010/0329358 A1 | 12/2010 | Zhang et al. |
| 2011/0058021 A1 | 3/2011 | Chen et al. |
| 2011/0069152 A1 | 3/2011 | Wang et al. |
| 2013/0044183 A1* | 2/2013 | Jeon et al. ................. 348/43 |
| 2013/0101017 A1* | 4/2013 | De Vleeschauwer et al. ................. 375/240.02 |

OTHER PUBLICATIONS

Yoo, W.; Shu Shi; Jeon, W.J.; Nahrstedt, K.; Campbell, R.H.; , "Real-time parallel remote rendering for mobile devices using graphics processing units," *Multimedia and Expo (ICME), 2010 IEEE International Conference on* , vol., no., pp. 902-907, Jul. 19-23, 2010.

* cited by examiner

REAL-TIME VIDEO CODING USING GRAPHICS RENDERING CONTEXTS

FIELD

The invention relates to video coding and more particularly to the real-time encoding and decoding of video extracted from graphics applications.

BACKGROUND

As video games become more social and acquire features permitted by increased computing power and high bandwidths, new ways to provide those games have evolved as well. An emerging game facilitation paradigm is referred to as cloud gaming services, e.g., the ONLIVE service. The concept of cloud gaming is to render 3D video games on cloud servers and then send each rendered game scene as a 2D video stream to the game player through broad-band networks.

The player's control signals (mouse, keyboard, or game controller events) are sent back to the cloud server to interact with the 3D video game. The cloud gaming service allows the gamer to play the most advanced 3D video games without buying high-end graphics hardware. In addition, cloud gaming also represents a new method of game distribution that can effectively prevent pirating. An exemplary cloud gaming topology 100 is illustrated schematically in FIG. 1, and includes a mobile client 101, rendering server 102, and mobile network(s) 103 connecting the two.

Of course, these benefits come at a price, albeit a modest one; cloud gaming depends on high bandwidth networks to deliver game video streams. For example, ONLIVE requires a wired network connection with no less than 5 Mbps constant bandwidth to provide 720 p 30 fps gaming services. Such a high-bandwidth requirement becomes a barrier for users who do not have broadband network connections. Thus, mobile users who have only mobile network connections cannot typically benefit from cloud gaming services.

Conventionally, within the cloud gaming paradigm, game frames are compressed with state-of-art H.264/AVC video encoders in real time to generate the video stream for users. However, compared to the general-purpose offline H.264/AVC encoder, the real-time H.264/AVC encoder cannot leverage optimizations that require a momentary look-ahead buffer or multiple encoding passes. Therefore, the real-time H.264/AVC encoder has a much lower encoding efficiency and leads to high-bandwidth requirements for cloud gaming services.

In U.S. Patent No. 2006/0088220A1 (Cheung et al.) a graphics to video encoder is presented that integrates both the base images rendered on the server and the client images constructed from client inputs and generate the video streams for the specified client user. However, the aforementioned reference focuses on the generation of customized client video stream but fails to address coding efficiency. In a related vein, US Patent No. 2010/0166068A1 (Perlman et al.) describes a system for cloud gaming services, and discusses reducing the overall system latency by smoothing the output bandwidth so that the latency caused by bandwidth peaks can be reduced, but it fails to reduce the overall bandwidth needed compared with the current H.264/AVC based video coder.

U.S. Pat. No. 7,194,033 B2 (Zhenya Alexander Yourlo) describes a technique that aims to efficiently encode images rendered by a graphical engine. However, the aforementioned method requires division of the input image frames into different categories based on the non-pixel changes between the current frame and the previous frame and applies different coding methods to different categories. The '033 invention also fails to apply graphics rendering contexts and image based rendering techniques to exploit frame coherence and assign the useful bits for the most important contents in the video. Moreover, it is not clear that the '033 method is available for real time video coding U.S. Patent No. 2010/0166054 A1 (Wirick) describes a real-time video coding method that integrates online coding and off-line coding to improve coding performance. However, Wirick does not use graphics contexts to improve coding. Similarly, U.S. Patent No. 2011/0058021 A1 (Chen et al.) shares some concepts with the foregoing, but fails to apply 3D image warping to synthesize frames of different time. Moreover, the Chen invention fails to account for camera motion, and only the actually captured frames can be selected as reference frames. The same shortcomings are seen in U.S. Patent No. 2011/0069152 (Wang et al.) and U.S. Patent No. 2010/0329358 A1 (Zhang et al.).

SUMMARY

In an embodiment of the invention, a method is provided for encoding video for streaming. The method includes receiving a plurality of sequential image frames generated by a 3D graphics rendering engine. Graphics rendering contexts are obtained, including pixel depth map, rendering camera parameters, and camera motion from the 3D rendering engine. The method entails selecting key frames among the plurality of sequential image frames, interpolating non-key frames via 3D image warping, and encoding all key frames and warping residues of non-key frames. Warping residues of non-key frames represent a difference between an interpolation result and an original image frame.

In a further embodiment of the invention, a system is provided for transmitting video. The system includes a server configured to receive a plurality of sequential image frames generated by a 3D graphics rendering engine and to obtain graphics rendering contexts including pixel depth map, rendering camera parameters, and camera motion from the 3D rendering engine. The server is further configured to select key frames among the plurality of sequential image frames, interpolate non-key frames via 3D image warping, and encode all key frames and warping residues of non-key frames. The system includes a mobile user device wirelessly linkable to the server for receiving the encoded frame data. The mobile user device is configured to decode the encoded frame data and display a corresponding image to a user of the mobile user device.

Other features and advantages of the invention will be appreciated from the following detailed description taken in conjunction with the attached figures of which:

DETAILED DESCRIPTION

Figure 1:
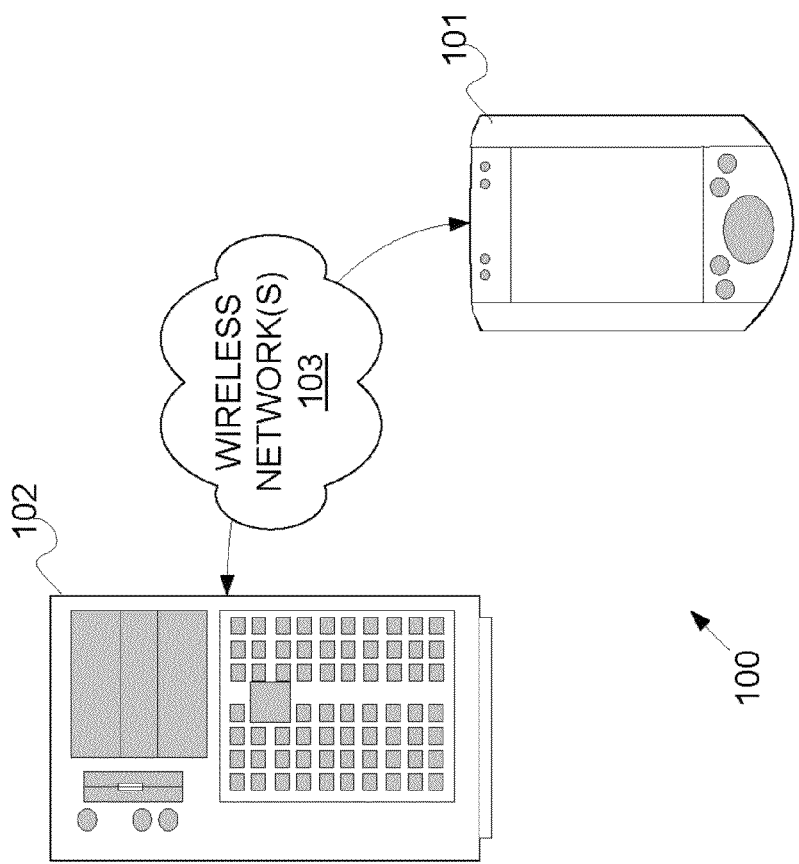
FIG. 1 is a cloud gaming schematic diagram within which embodiments of the invention may be implemented.

As noted above, cloud gaming has many benefits, but is not universally accessible due to bandwidth and hardware constraints. The inventors have approached the problem from a system perspective to identify a new technique and system for solving the problems inherent in cloud gaming systems today. In particular, since the video encoder runs together with the 3D video game engine, the graphics rendering context information (such as rendering viewpoint, pixel depth, camera motion, etc.) can be obtained while capturing an image from the frame buffer. With this, a real-time video coding method is described that takes advantage of these graphics rendering context elements and significantly improves video coding efficiency compared with traditional H.264/AVC real-time encoding.

The present invention includes a video encoder and a video decoder. The encoder takes the sequential image frames generated by a 3D graphics rendering engine as input. Meanwhile, the encoder accesses the graphics rendering contexts, including pixel depth map, camera parameters, and camera motion from the rendering engine to assist video coding. The output of the proposed video encoder is the highly compressed video stream, which can be decoded by the proposed video decoder. The decoder is configured to decode the video stream and restore the original image frames for display.

One aspect of the described video coding is to select the key frames in the input image initially, employ 3D image warping to interpolate other non-key frames, and finally encode all key frames and warping residues (difference between interpolation result and original image frame) of non-key frames with H.264/AVC. 3D image warping is an image-based rendering technique that can efficiently warp an image to any new viewpoint given the pixel depth and original rendering viewpoint. In an embodiment of the invention, the interpolation allows the system to encode the warping residues with much lower bit rate, and assign more bit rate to encode the key frames, and therefore improve the coding performance.

In overview then, embodiments of the invention provide video coding utilizing graphics rendering context information and integrating 3D image warping with H.264/AVC for high performance real time video encoding. A rate allocation scheme dynamically and effectively allocates different bit rates to key frame encoding and non-key frame encoding.

In a further embodiment of the invention, a key frame selection strategy operates by selecting the frames that do not exist in the original input image sequence as key frames in some situations to achieve the best coding performance. The performance of the described video coding method was compared to state-of-art H.264/AVC, and the resultant rate-PSNR results show that the described method outperforms H.264/AVC in real time video coding.

Turning to a more detailed explanation, the proposed 3D image warping assisted video coding method will be discussed in greater detail, as will the key frame selection and different frame selection solutions. Table 1 summarizes the notations and variables used.

TABLE 1

Notations and Variables

| Name | Description |
|---|---|
| $I_x$ | Image map of frame x. $I_x'$ denotes the distorted image after passing $I_x$ through image encoder and decoder. |
| $D_x$ | Depth map of frame x. $D_x'$ denotes the distorted depth after passing $D_x$ through depth encoder and decoder. |
| $v_x$ | Rendering viewpoint of frame x. |
| $\tilde{I}_x^y$ | $\tilde{I}_x^y$ = warping($<I_x, D_x>$, $v_x \to v_y$), the result image of warping $<I_x, D_x>$ from viewpoint $v_y$ to $v_x$. |
| $\Delta_x^y$ | $\Delta_x^y = I_x - \tilde{I}_x^y$. The warping residue of frame x. $\Delta_x$ is used when the reference is not clearly specified. |
| ref(x) | The reference R frame for $I_x$. |
| S | A set of all source video frames. |
| R | A set of all R frames. $\|R\|$ denotes the number of R frames in the set. |
| W | A set of all W frames. $\|W\|$ denotes the number of W frames in the set. |
| r | The actual bit rate of the encoded video. $r_x$ denotes the bit rate of the whole video, $r_{RI}$, $r_{RD}$, and $r_W$ denote the bit rate of R frame image, R frame depth, and W frame, respectively. |
| req | The target bit rate set for video encoding. $req_s$ denotes the target bit rate of the whole video, $req_{RI}$, $req_{RD}$, and $req_W$ are used to configure x264 to encode image, depth, and residue. |
| b | $b_x$ denotes the size of the encoded frame x. |
| t | $t_X$ denotes the time of playing the frame set. $t_S$ denotes the video time. $t_{RI}$, $t_{RD}$, and $t_W$ denote the time to play the component frames. Since the frame rate is the same, $t_X \propto \|X\|$. |

The method initially selects a set of key frames (named R frames) in the video sequence based on the graphics rendering contexts extracted from the 3D video game engine. A 3D image warping algorithm is then used to interpolate other intermediate frames (named W frames) with the selected R frames, and the R frames and warping residues of W frames are encoded via x264. The method improves the coding performance by assigning more bit rate to encoding the more important R frames and less bit rate for W frame residues.

Figure 2:
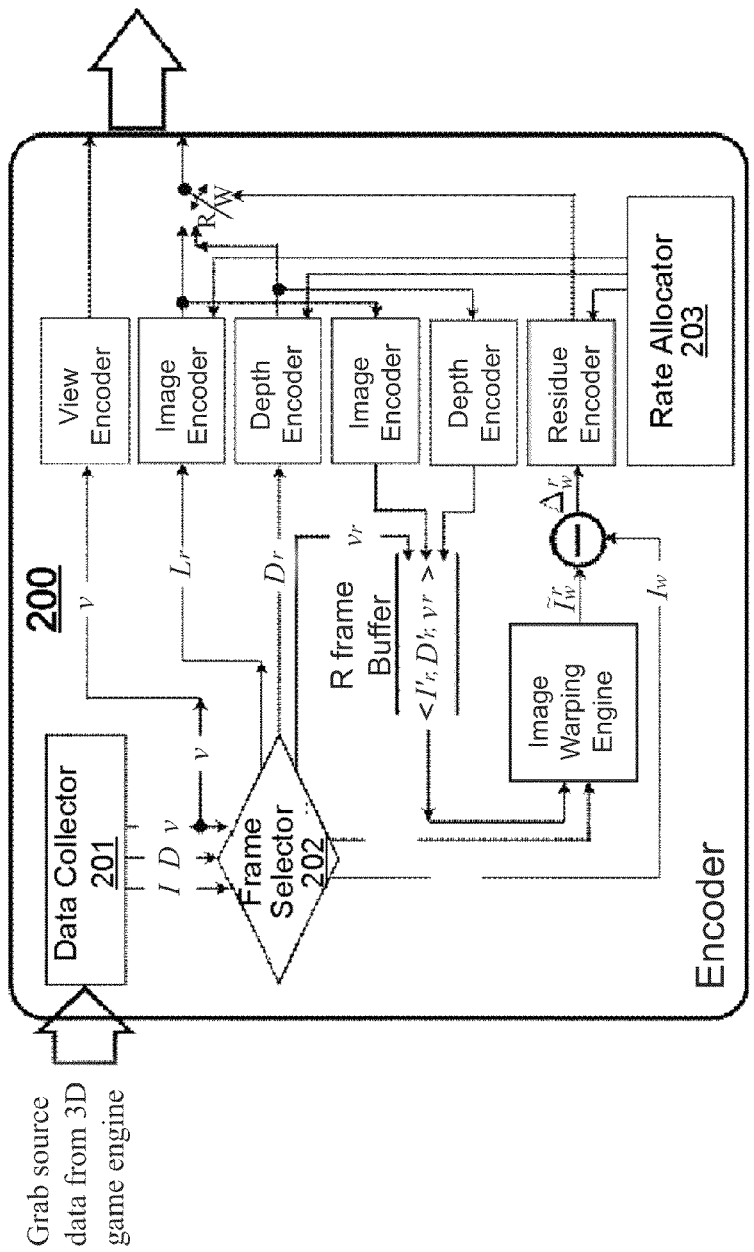
FIG. 2 is a schematic illustration of a framework for a 3D image warping assisted video encoder in accordance with an embodiment of the invention.
Figure 3:
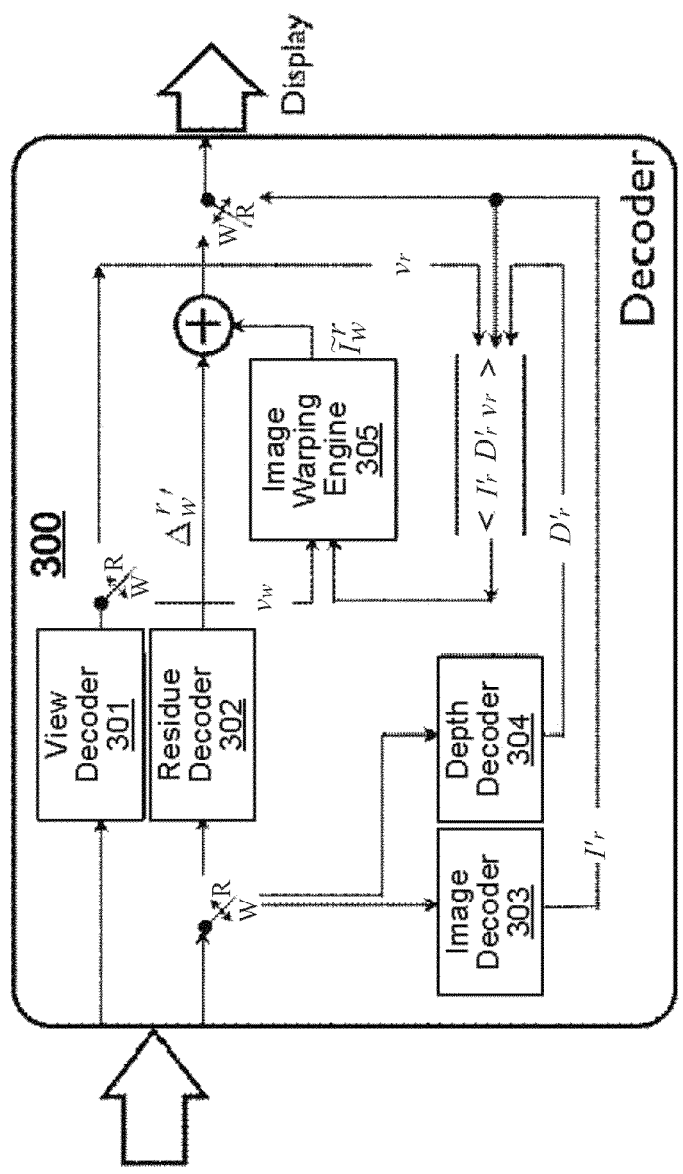
FIG. 3 is a schematic illustration of functional modules employed in the proposed video decoder according to an embodiment of the invention.

FIGS. 2 and 3 show the overall framework in schematic form to illustrate primary data flows and operations. In particular, referring to FIG. 2, the encoder 200 includes a data collector 201 for receiving 3D source data. The received data is forwarded to a frame selector 202 and the resultant frames forwarded for warping and combination as described above. The context information is also forwarded for use during the encoding stage. A rate allocator 203 selects rate for W and R frames as discussed further below and controls the encoding based on the allocated rates. As can be seen, the method exploits frame-to-frame coherence, and with the support of graphics rendering contexts, the method runs much faster than the search based motion estimation algorithms, and thus is more efficient in the real-time cloud gaming scenario.

With respect to 3D image warping used in embodiments of the invention, this is an image-based rendering technique that takes three inputs: (1) a depth image ($<I_x, D_x>$) that contains both color and depth maps; (2) the image's rendering viewpoint ($v_x$) that includes the camera position coordinate, the view direction vector, and the up vector; and (3) a new viewpoint ($v_y$). The output of the algorithm is the color image at the new viewpoint ($\tilde{I}_x^y$).

FIG. 3 is a schematic illustration of a decoder 300 that employs this technique. The decoder 300 includes a view decoder 301, residue decoder 302, and image and depth decoders 303, 304. An image warping engine 305 operates on the decoded view and residue, and its output is employed to modify the decoded residue.

An advantage of the described 3D image warping algorithm is its lack of computational complexity. The algorithm scans the image only once and it takes only a few arithmetic operations to process each pixel. Therefore, the algorithm is very computationally efficient and requires no graphical hardware support. The shortcoming of image warping is that it may create warping artifacts. Holes can be generated when occluded objects become visible in the new viewpoint because there is no pixel in the input image to reference when drawing the new image. This is also referred to as the exposure problem.

The way in which to apply the 3D image warping algorithm to assist video coding can be described as follows. Given a source video frame set $\{I_x | x \in S\}$, if we also know the depth map $\{D_x | x \in S\}$ and viewpoint $\{v_x | x \in S\}$ of each frame, we can select a group of R frames as R and the remaining frames, all W frames, as W. The warping version $\{\tilde{I}_x^{ref(x)'} | x \in W\}$ can be generated by running 3D image warping algorithm for every W frame. We have $$\tilde{I}_x^{ref(x)'} = \text{warping}(<I'_{ref(x)}, D'_{ref(x)}>, v_{ref(x)} \rightarrow v_x)$$

where $I'_{ref(x)}$ and $D'_{ref(x)}$ are the distorted version of passing the original $I_{ref(x)}$ and $D_{ref(x)}$ through both encoder and decoder ($v_{ref(x)}$ is not distorted because we always apply lossless encoding for viewpoints). The quantity ref(x) denotes the reference R frame for $I_x$. Since the application scenario is real-time video coding, any frame can only reference from previous frames. Thus ref(x)<x. Then the difference between the warping results and the original video frames is calculated as the warping residue $\{\Delta_x^{ref(x)'} | x \in W\}$, where $$\Delta_x^{ref(x)} = I_x - \tilde{I}_x^{ref(x)}$$

Finally, we encode the video sequence of all R frames with depth images $\{<I_x, D_x> | x \in R\}$, residues of all W frames $\{\Delta_x | x \in W\}$ ($\Delta_x$ is used as the short for $\Delta_x^{ref(x)'}$), and all viewpoint information $\{v_x | x \in S\}$.

On the decoder side, if the received video frame is an R frame, we are able to decode $I_r'$, $D_r'$ and $v_r$. The image $I_r'$ should be directly displayed on the mobile screen and at the same time saved in the buffer together with $D_r'$ and $v_r$. If the video frame is a W frame, we get the distorted residue $\Delta$ and the viewpoint $v_w$. The 3D image warping algorithm is then run for the saved R frame to calculate the warping frame $\tilde{I}_w^{r'}$ and then the target image frame $I_w'$ is retrieved by adding $\Delta'_w$ to $\tilde{I}_w^{r'}$.

As noted above, one reason for using 3D image warping in video coding is to reduce the pixel signals on W frames so that they can be more efficiently encoded. The saved bit rate can be applied to encode the more important R frames. Thus, the question of rate allocation strategy should be addressed.

Initially, the relationships between the different components of the video bit rate are analyzed. We can represent the overall rate $r_S$ as follows:

$$r_S = r_{R_I} + r_{R_D} + r_W \quad (1)$$

where $$r_{R_I} = \frac{\sum_{x \in R} b_{I_x}}{t_S}, \quad r_{R_D} = \frac{\sum_{x \in R} b_{D_x}}{t_S}, \quad r_W = \frac{\sum_{x \in W} b_{\Delta_x}}{t_S}$$

We need not consider the rate for encoding viewpoints in Eq. (1) because the rate used for encoding viewpoint vectors (36 bytes per frame before compression) is negligible relative to the rate used for image frame compression. The x264 protocol allows a target bit rate req_r when encoding a video sequence, and it automatically adjusts the encoding parameters to meet the requirement.

$$req_{R_I} \approx \frac{\sum_{x \in R} b_{I_x}}{t_R} \quad (2)$$

$$req_{R_D} \approx \frac{\sum_{x \in R} b_{D_x}}{t_R} \quad (3)$$

$$req_W \approx \frac{\sum_{x \in W} b_{\Delta_x}}{t_W} \quad (4)$$

Therefore, we do not need to manage the encoding size of every single frame but just find the appropriate bit rate $req_{R_I}$, $req_{R_D}$, and $req_W$ to configure x264. We can apply Eq. (2), (3), (4) to Eq. (1):

$$r_S \approx \frac{\|R\| \cdot (req_{R_I} + req_{R_D}) + \|W\| \cdot req_W}{\|R\| + \|W\|} \quad (5)$$

In an embodiment of the invention, a static strategy is used for rate allocation. We allocate a fixed portion of the overall available bit rate $f_R \cdot r_S$ to R frames, where $0 < f_R < 1$. The inventors have run experiments for each $f_R$ value and found that 0.5 is a favourable value. The bit rate allocated for R frame depth map encoding is the half of the bit rate allocated for color map encoding because the depth map is not affected by the image textures. In practice, we also find that depth encoding can achieve very high quality (50+dB) with a relatively low bit rate (600 Kbps). Therefore, we set a threshold $T_{depth}$ for depth encoding to allocate no more bit rate than $T_{depth}$. Considering that we run x264 separately for three different components and the difference between the request bit rate and the actual encoded bit rate may be accumulated, $req_W$ can be dynamically changed based on the actual bit rate of R frame encoding. As a result, given a target bit rate $req_S$, the bit rates of each component are calculated as follows:

$$req_{R_D} = \min\left(T_{depth}, \frac{\|R\| + \|W\|}{3 \cdot \|R\|} \cdot f_R \cdot req_S\right) \quad (6)$$

$$req_{R_I} = \frac{\|R\| + \|W\|}{\|R\|} \cdot f_R \cdot req_S - req_{R_D} \quad (7)$$

$$req_W = + \frac{\|R\|}{\|W\|} \cdot (req_S - r_{R_D} - r_{R_I}) \quad (8)$$

The rate allocation strategy is based on an assumption that the warping residues of W frames contain much less signal and can be encoded more efficiently than original image frames. However, this assumption may not be true if R frames are not carefully selected. Thus, we discuss three different frame selection strategies that may be used if desired in embodiments of the invention.

The fixed interval frame selection starts from the first frame of the video sequence, selecting the frames sequentially to form groups. All frame groups have the same fixed size, which is defined as warping interval. The first frame of each group is selected as R frame and the rest are W frames. The R frame in the group is referenced by all W frames of the same group. As long as the warping interval remains small, the viewpoints of the frames in the same group are likely to be close to each other so that 3D image warping can help remove most pixels.

A fixed interval solution may be easier to implement. It does not require any other graphics rendering contexts except the rendering viewpoint and pixel depth required by 3D image warping. The rate allocation for fixed interval is also simplified. We do not need to dynamically change the bit rate request because the ratio of R and W is fixed all the time.

The fixed interval solution is conservative in reducing the number of R frames. For example, if the virtual camera remains static, all the frames will have the same background scene. Using only one R frame is enough for the whole static sequence. However, the fixed interval solution keeps generate R frames every warping interval. A dynamic interval strategy may instead be used. The dynamic interval approach processes the encoding in the same way as fixed interval, with only one difference. The encoder needs to compare the viewpoint of the currently processing frame with the viewpoint of the previously encoded R frame. If two viewpoints are identical, which means the virtual camera remains static, then the current frame is selected as W frame. In this way, the R frame number can be significantly reduced if the video sequence has a lot of static scenes. The reduction of R frame number allows the rate allocation module in our encoder to allocate more bit rate for R frame encoding (Eq. (6), (7)).

Figure 4:
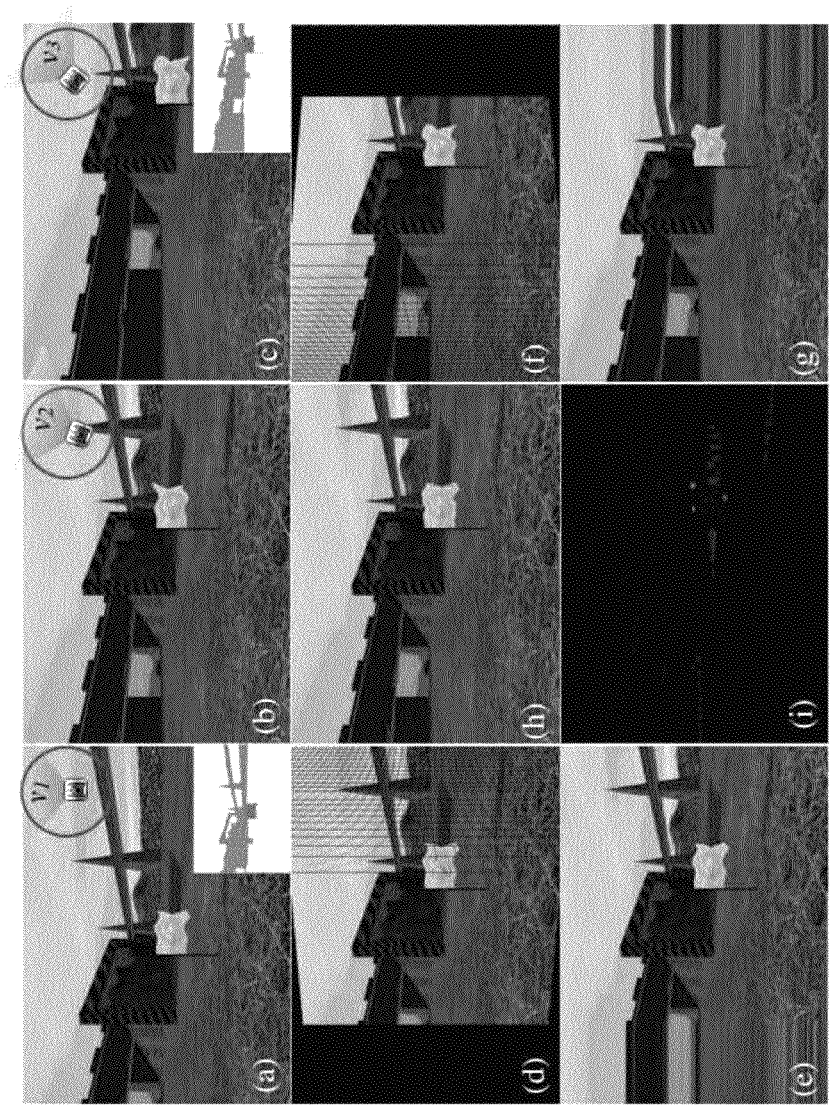
FIG. 4 is a series of mock images illustrating the concepts of depth image, 3D image warping, and double warping.

In an embodiment of the invention, a double warping strategy is employed. This approach uses the same strategy with dynamic interval for static sequences, and adds new optimization techniques for motion sequences. The warping artifacts caused by camera moving may be difficult to fix. For example, FIG. 4 shows a series of mock images illustrating the use of 3D image warping for the images in a camera panning sequence. Pixels of a large area are missing in the warping result because those pixels do not exist in the source image. Such artifacts can be effectively fixed by warping from one or more other reference frames which have the missing pixels—so called double warping. As shown, if the target viewpoint $v_2$ is on the right side of the source viewpoint $v_1$, the viewpoint $v_3$ of the second reference frame should be selected on the right side of $v_2$ to provide the best coverage. However, in the scenario of cloud gaming, when the virtual camera is panning right, the frame $I_3$ is actually rendered later than $I_2$, which means when $I_2$ is encoded, there is no $I_3$ available for double warping reference. In order to solve this problem, we modify the 3D video game engine to render auxiliary frames to support the video encoder to run double warping.

Figure 5:
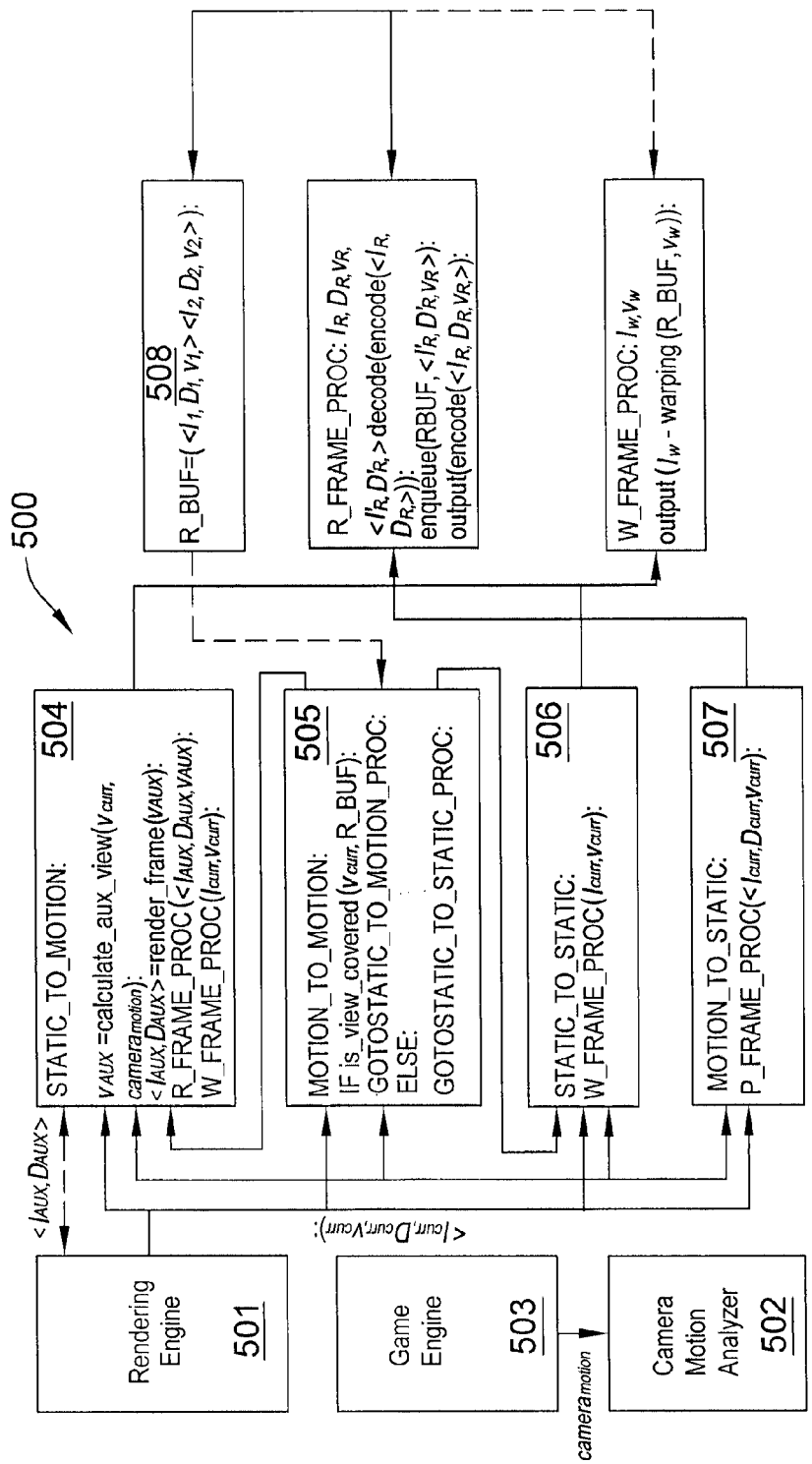
FIG. 5 is a block diagram showing the flow of reference (key) frame selection strategy when double warping is used in an embodiment of the invention.

FIG. 5 is a schematic data flow diagram 500 illustrating the work flow of double warping in detail. A rendering engine 501 and camera motion analyzer 502 (receiving input from the game engine 503) provide their output in parallel to modules 504-507, which respectively encode static to motion, motion to motion, static to static and motion to static. The modules 504-507 may be dedicated hardware modules or may be implemented as software modules. In the latter case, the modules are implemented as computer-readable code stored on a computer-readable medium, which when computer0executed instantiates the indicated modules.

The outputs of modules 504 and 506 are provided for W frame processing, while the output of module 507 is provided for R frame processing. In addition, an R buffer 508 may provide frames for motion to motion processing by module 505.

Figure 6:
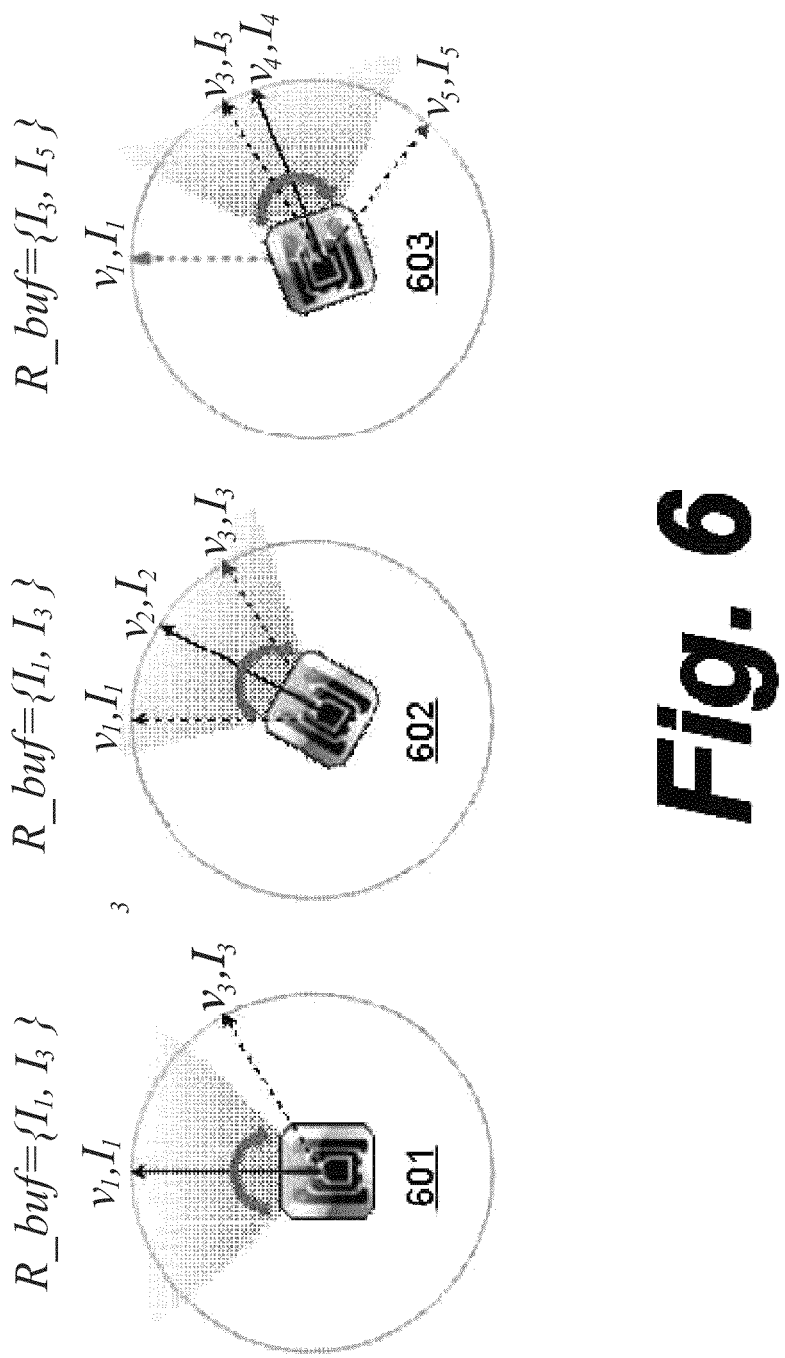
FIG. 6 is a multi-positional diagram showing an example of how auxiliary frames are generated and used when double warping reference frame selection is used in a video coder according to an embodiment of the invention.

The example shown in FIG. 6 shows the sources and results of the various flows. Initially at stage 601, the viewpoint is $v_1$ and the image frame $I_1$ is captured. If a panning right motion is detected as at stage 602, the encoder will not only encode the current frame $I_1$, but also request the game engine to render the frame $I_3$ at the viewpoint $v_3$. $I_3$ does not exist in the game video sequence, but is generated only to support the double warping for all intermediate viewpoints between $v_1$ and $v_3$. Both $I_1$ and $I_3$ are selected as R frames and saved in the buffer.

As time goes by, the viewpoint pans right to $v_2$. It is well covered by two R frames $I_1$ and $I_3$. Thus $I_2$ is selected as W frames and double warping is applied to calculate the residue. If the viewpoint keeps moving to $v_4$, as in stage 603, which is out of the coverage area of $I_1$ and $I_3$, the encoder will ask the game engine to render a new auxiliary frame $I_5$ at the viewpoint $v_5$. $I_5$ will be selected as R frame, added to the buffer to replace $I_1$. Both $I_3$ and $I_5$ are used to support the double warping of $I_4$.

Compared with the previous two frame selection strategies, double warping is able to improve the encoding performance further by reducing the warping residues created in motion sequences and using fewer R frames. Double warping not only takes the rendering viewpoint and pixel depth for 3D image warping, but also detects the camera motion events in the 3D video game engine and reuses the rendering engine to generate auxiliary frames.

It will be appreciated that a new and useful system and technique for video encoding and decoding in the context of at least cloud gaming have been described. However, these preferred embodiments described herein are not meant to be limiting. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method for encoding video for streaming, comprising:
   receiving a plurality of sequential image frames generated by a 3D graphics rendering engine;
   obtaining rendering context information including depth maps and camera viewpoints from the 3D rendering engine;

selecting key frames from the plurality of sequential image frames based on depth maps and camera viewpoints corresponding to each selected key frame;

designating frames that do not exist in the plurality of sequential image frames as key frames;

generating warping residues corresponding to each non-key frame by applying, for each non-key frame, a transform that redefines the non-key frame in relation to a camera viewpoint corresponding to a key frame; and encoding the key frames and the warping residues.

2. The method in accordance with claim 1, wherein the key frames and the warping residues are encoded using the H.264/AVC standard.

3. The method in accordance with claim 1, further comprising applying a rate allocation scheme to allocate bit rates to key frame encoding and non-key frame encoding.

4. The method in accordance with claim 3, wherein the step of applying a rate allocation scheme to allocate bit rates to key frame encoding and non-key frame encoding comprises employing a static rate allocation strategy that allocates a fixed portion of an overall available bit rate to key frames.

5. The method in accordance with claim 3, wherein the step of applying a rate allocation scheme to allocate bit rates to key frame encoding and non-key frame encoding comprises employing a fixed interval frame selection strategy.

6. The method in accordance with claim 3, wherein the step of applying a rate allocation scheme to allocate bit rates to key frame encoding and non-key frame encoding comprises employing a dynamic interval strategy.

7. A system for transmitting video comprising:

a server configured to receive a plurality of sequential image frames generated by a 3D graphics rendering engine and to obtain rendering context information including depth maps and camera viewpoints from the 3D rendering engine, the server being further configured to select key frames from the plurality of sequential image frames based on depth maps and camera viewpoints corresponding to each selected key frame, designate frames that do not exist in the plurality of sequential image frames as key frames, generate warping residues corresponding to each non-key frame by applying, for each non-key frame, a transform that redefines the non-key frame in relation to a camera viewpoint corresponding to a key frame, and encode the key frames and the warping residues; and a mobile device wirelessly linkable to the server, configured to receive the encoded key frames and the encoded warping residues, to decode the encoded key frames and the encoded warping residues, and to display corresponding images on a display of the mobile device.

8. The system in accordance with claim 7, wherein the key frames and the warping residues are encoded using the H.264/AVC standard.

9. The system in accordance with claim 7, wherein the server is further configured to apply a rate allocation scheme to allocate bit rates to key frame encoding and non-key frame encoding.

10. The system in accordance with claim 9, wherein applying a rate allocation scheme to allocate bit rates to key frame encoding and non-key frame encoding comprises employing a static rate allocation strategy that allocates a fixed portion of an overall available bit rate to key frames.

11. The system in accordance with claim 9, wherein applying a rate allocation scheme to allocate bit rates to key frame encoding and non-key frame encoding comprises employing a fixed interval frame selection strategy.

12. The system in accordance with claim 9, wherein applying a rate allocation scheme to allocate bit rates to key frame encoding and non-key frame encoding comprises employing a dynamic interval strategy.

13. The system in accordance with claim 7, wherein the displayed images are associated with a cloud gaming activity hosted by the server and engaged in by the mobile user device.

14. A server for encoding video for streaming, comprising a non-transitory processor-readable medium having processor-executable instructions stored thereon, the processor-executable instructions comprising instructions for:

receiving a plurality of sequential image frames generated by a 3D graphics rendering engine;

obtaining rendering context information including depth maps and camera viewpoints from the 3D rendering engine;

selecting key frames from the plurality of sequential image frames based on depth maps and camera viewpoints corresponding to each selected key frame;

designating frames that do not exist in the plurality of sequential image frames as key frames;

generating warping residues corresponding to each non-key frame by applying, for each non-key frame, a transform that redefines the non-key frame in relation to a camera viewpoint corresponding to a key frame; and encoding the key frames and the warping residues.

15. The server in accordance with claim 14, wherein the key frames and the warping residues are encoded using the H.264/AVC standard.

16. The server in accordance with claim 14, wherein the processor-executable instructions further comprise instructions for:

applying a rate allocation scheme to allocate bit rates to key frame encoding and non-key frame encoding.

17. The server in accordance with claim 16, wherein applying a rate allocation scheme to allocate bit rates to key frame encoding and non-key frame encoding comprises employing a static rate allocation strategy that allocates a fixed portion of an overall available bit rate to key frames or employing a dynamic interval strategy.

* * * * *